United States Patent [19]
Azar

[11] Patent Number: 5,778,177
[45] Date of Patent: Jul. 7, 1998

[54] INTERACTIVE SCANNING DEVICE OR SYSTEM

[75] Inventor: Kaveh Azar, Westwood, Mass.

[73] Assignee: AT&T Corp., New York, N.Y.

[21] Appl. No.: 933,198

[22] Filed: Sep. 18, 1997

Related U.S. Application Data

[63] Continuation of Ser. No. 752,970, Dec. 2, 1996, abandoned, which is a continuation of Ser. No. 314,116, Sep. 28, 1994, abandoned.

[51] Int. Cl.[6] ................................................. H04N 1/00
[52] U.S. Cl. .................... 395/200.32; 382/25; 382/26; 128/916
[58] Field of Search ............................ 340/825.1; 348/195, 348/201, 383; 382/25, 26, 28, 62; 128/916, 660.08; 395/200.32, 200.47, 200.57

[56] References Cited

U.S. PATENT DOCUMENTS

| | | |
|---|---|---|
| 4,885,844 | 12/1989 | Chun. |
| 4,937,667 | 6/1990 | Choquet et al.. |
| 4,978,224 | 12/1990 | Kishimoto et al.. |
| 5,019,992 | 5/1991 | Brown et al.. |
| 5,062,136 | 10/1991 | Gattis et al.. |
| 5,114,226 | 5/1992 | Goodwin et al.. |
| 5,170,439 | 12/1992 | Zeng et al.. |
| 5,175,773 | 12/1992 | Garreau et al.. |
| 5,224,049 | 6/1993 | Mushabac. |
| 5,255,211 | 10/1993 | Redmond. |
| 5,257,183 | 10/1993 | Tam. |
| 5,289,465 | 2/1994 | Mouro et al.. |
| 5,297,022 | 3/1994 | Watanabe .................. 364/474.24 |
| 5,338,198 | 8/1994 | Wu et al. ................... 433/213 |
| 5,360,446 | 11/1994 | Kennedy .................... 623/16 |
| 5,452,407 | 9/1995 | Crook ....................... 364/474.24 |
| 5,454,717 | 10/1995 | Andreiko et al. ............. 433/24 |

*Primary Examiner*—Emanuel Todd Voeltz
*Assistant Examiner*—Thomas Peeso
*Attorney, Agent, or Firm*—Orrick, Herrington & Sutcliffe LLP

[57] ABSTRACT

An interactive scanning device or system having one or more single or multi-dimensional scanners, an input device, an image processor, and a communication interface, for scanning an object or surface and interactively displaying and manipulating a threedimensional image of the object or surface from the geometrical dimensions of the object or topology of the surface captured during scanning. The communication interface enables the geometrical dimensions of the object, the topology of the surface, or the image of the object, to be transmitted over a wire or wireless communication medium to an end user station having an interactive scanning device or a computer station, or both, for initial or further display and manipulation. A further embodiment of the present invention incorporates a photosensitive or photographic recording device to capture an optical image of the object or surface to superimpose with the scanned image.

53 Claims, 3 Drawing Sheets

INTERACTIVE SCANNING DEVICE OR SYSTEM

This application is a continuation of application Ser. No. 08/752,970 filed on Dec. 2, 1996, now abandoned which is a continuation of application Ser. No. 08/314,116 filed on Sep. 28, 1994, now abandoned.

FIELD OF THE INVENTION

The invention relates generally to communication systems, and more particularly to an interactive scanning device and system for use with communication systems, including telecommunication systems.

BACKGROUND OF THE INVENTION

Existing communication systems permit the interactive display and manipulation of multi-dimensional images created using computer-aided design ("CAD") programs. Integrating scanning of real, tangible objects or surfaces with these existing communication systems would greatly improve perception and communication in many applications including, for example, video conferencing, video-based shopping, architectural modeling, accident-site medical treatment, and the like.

SUMMARY OF THE INVENTION

The present invention enhances perception and communication achieved with existing communication systems by integrating scanning, three-dimensional computer modeling, and communication systems for interactively displaying and manipulating a three-dimensional image of an object or surface.

One embodiment of the present invention is an interactive scanning device or system having at least one single or multi-dimensional scanner, an input device, an image processor, an image display, and a communication interface. The scanner or scanners capture information about an object or surface, namely the geometrical dimensions of the object or the topology of the surface, and the image processor interactively displays and manipulates a three-dimensional image of the object or surface on the image display, from the information.

The image processor accomplishes the interactive display and manipulation by way of a CAD program or other solid modeling program and is interactively controlled by the end user via the input device.

With the communication interface, the information or image of the object or surface can be transmitted over a wire or wireless communication medium to an end user station having an interactive scanning device or a computer station, or both, for initial or further display and manipulation.

Another embodiment of the present invention further incorporates a photosensitive or photographic recording device to capture an optical image of the object or surface, such as a video camera, still photography camera, or the like. In this embodiment, the image processor functions to superimpose the optical image with the scanned image of the object or surface. In this way, a fuller, realistic image of the object or surface is displayed for the user. This image includes the colors and shading associated with the object or surface so that the object or surface appears as it would to the human eye.

DETAILED DESCRIPTION OF INVENTION

Figure 1:
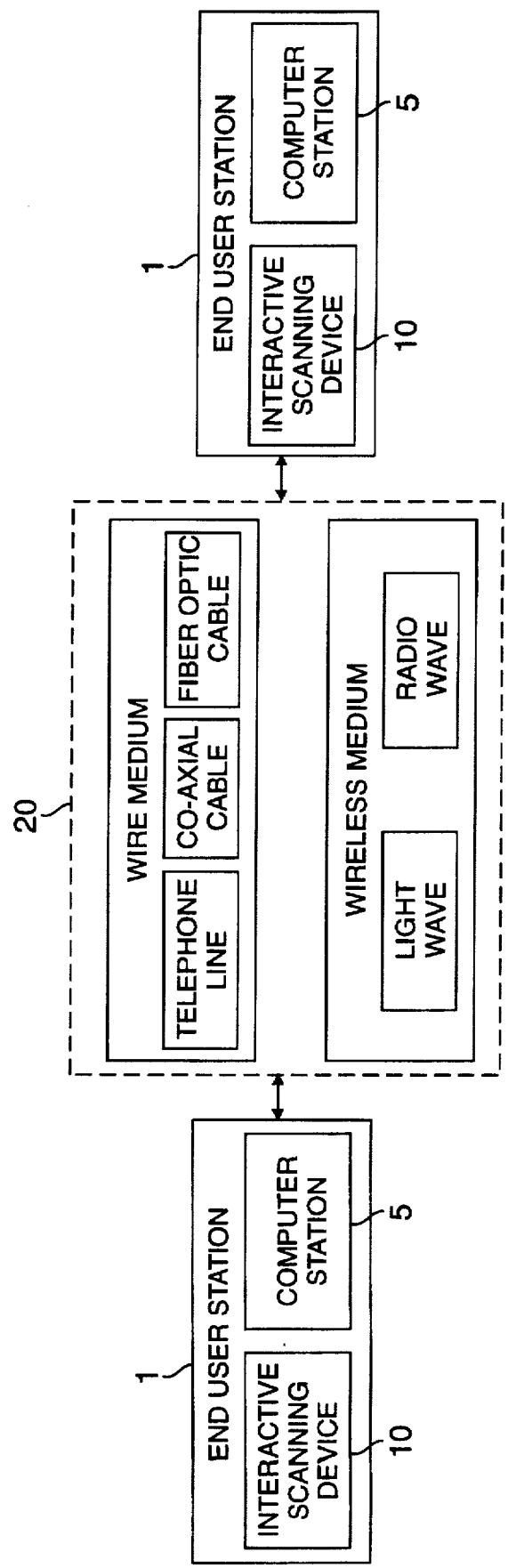
FIG. 1 is block diagram of one embodiment of the communication system of the present invention having two end user stations which are operably coupled to a wire or wireless communication medium.

FIG. 1 shows two end user stations 1 operably coupled to a communication or telecommunication medium 20. At least one of the end user stations 1 must have an interactive scanning device or system 10, with or without an additional computer station 5, and the other end user station can have either a computer station 5 or another interactive scanning device or system 10. In the specific embodiment shown in FIG. 1, however, each end user station 1 has both an interactive scanning device 10 and a computer station 5.

The communication medium 20 can be wire or wireless. In the case of a wire communication medium suitable alternatives include, but are not limited to, a telephone line, a co-axial cable, a fiber optic cable, and or an IEEE-488 bus. In the case of a wireless communication medium, suitable alternatives include, but are not limited to, any type or kind of light wave or radio wave.

Figure 2:
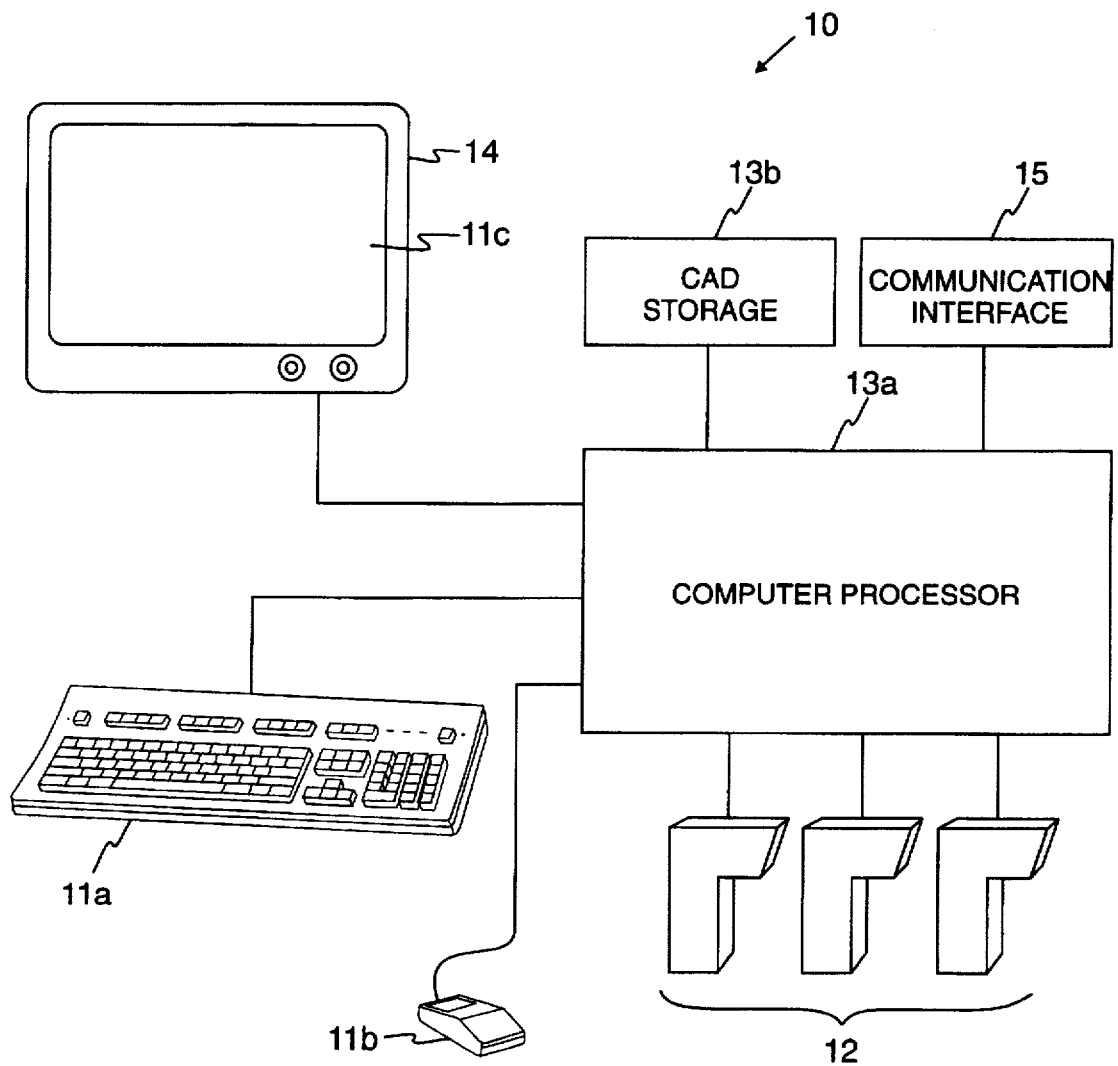
FIG. 2 shows one embodiment of the interactive scanning device and system of the present invention.

FIG. 2 shows one embodiment of the interactive scanning device and system 10 of the present invention. As shown in FIG. 2, the interactive scanning device or system 10 includes one or more input devices 11, at least one scanner 12, an image processor 13, comprising a computer processor 13a and a CAD storage 13b for storage of any suitable solid modeling program, an image display 14, and a communication interface 15.

The input device 11 includes such things as a keyboard 11a, a mouse 11b, a touch screen 11c, or any other device which enables the user of the present invention to interactively display and manipulate a three-dimensional image of an object or surface.

The scanner 12 includes infrared, radio waves, radar, or laser scanning equipment. Other scanning equipment might include ultra-sound or low level radiation depending on the application. Such things as police radar scanners and electron scanning microscopes could be used, for example. The presently preferred scanner 12 uses radio waves because, with the current state of technology, radio waves provide more consistent reflections despite changes in the surface of the object than any of the other type of scanning device.

The scanner 12 may comprise one or more single or multi-dimensional scanners. If only one scanner is used, the object will likely need to be rotated so that the geometrical dimensions of the object or the topological information associated with more than one surface of the object can be captured by the scanner. Alternatively, the object can remain partially or wholly fixed with the use of a plurality of scanners appropriately positioned around the object.

The image processor 13 may suitably include, for example, a computer processor 13a using a CAD program 13b or other solid modeling software package, such as those available from Parametrics or TurboCAD. The computer processor 13a can be any of a variety of devices capable of processing the information obtained by scanning an object or surface, or both, in conjunction with a solid modeling program. Examples include a microprocessor, a personal computer, a minicomputer, a mainframe computer, and a computer work station. The solid modeling software packages 13b allow interactive display and manipulation of the scanned object or surface on the image display 14. In other words, users can communicate about an object or surface and individually, as well as collectively, manipulate the image of the object in the form of rotation, cut and paste, and the like.

The image display 14 can typically be a standard video monitor or other display device now known, or hereafter known, to those of skill in the art.

The specific communication interface 15 is dictated by the communication medium to which the present invention is intended to be operably coupled. If the communication medium is a telephone line of a telephone network, a suitable modem will suffice. If the communication medium is an IEEE-488 bus in a local area network ("LAN"), then a standard LAN adapter card can be used. On the other hand, if the device is intended for use in both environments, then both interfaces can be used.

In operation, the scanner 12 captures the geometrical dimensions of the object and the topological data associated with its surfaces. The data is then, if desired, stored in the device memory or in memory associated with the image processor 13. To ensure image integrity, after scanning, the image is preferably displayed on the image display 14 by way of the image processor 13 and then transmitted over the telecommunication medium 20 to another interactive scanning device 10 or computer station 5 using the same or similar solid modeling software program. At either location, the image can be interactively displayed and manipulated by the user.

Figure 3:
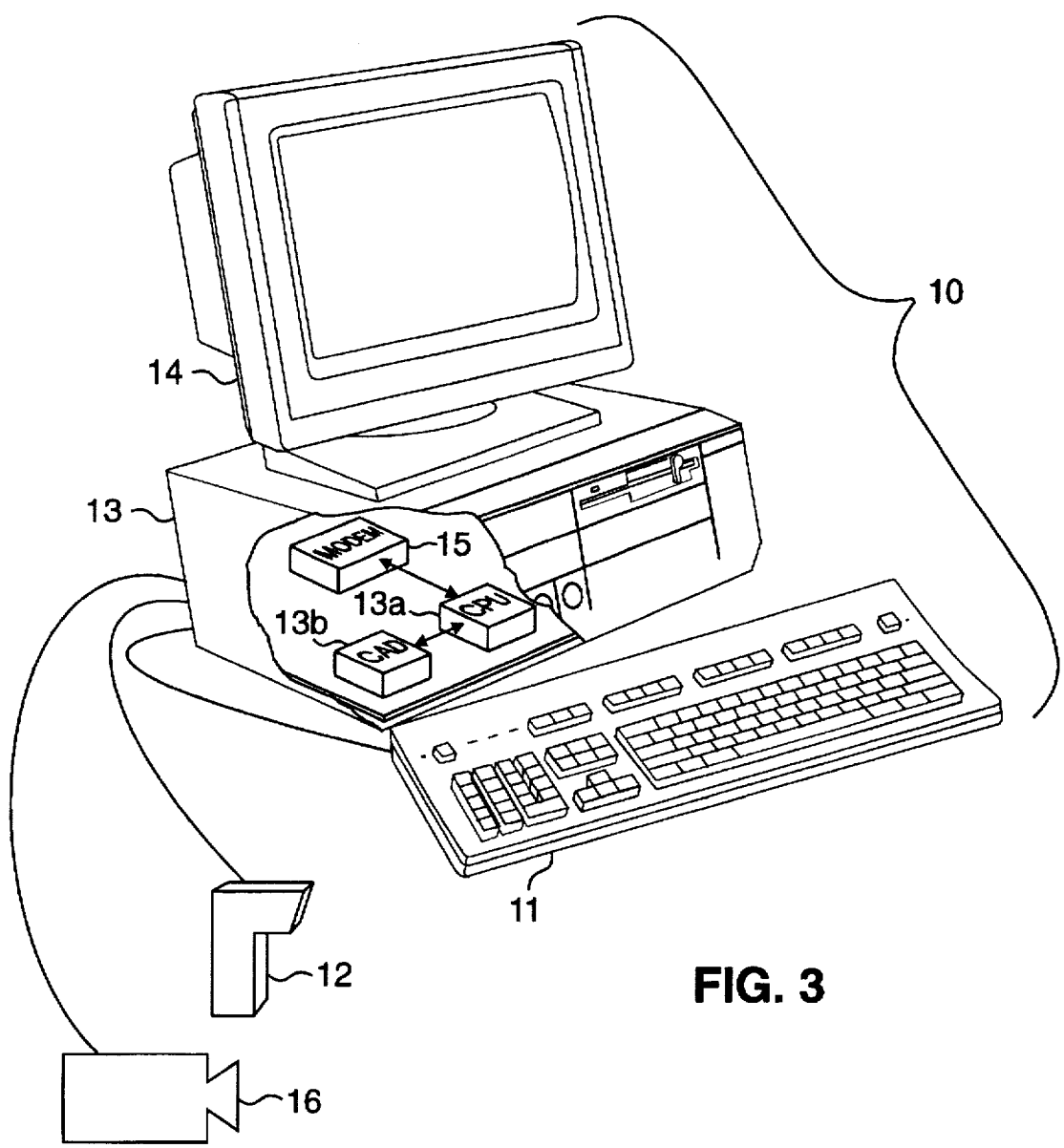
FIG. 3 shows another embodiment of the interactive scanning device and system of the present invention.

FIG. 3 shows a further embodiment of the present invention which superimposes the optical image of the object or surface with the scanned image of the object or surface. With this embodiment, the colors and shading associated with the object or surface are included to provide a view of the object or surface as it would look to the human eye.

One specific implementation of the further embodiment of the present invention is shown in FIG. 3. The scanning device or system 10 shown in this implementation includes a personal computer 13 having a CPU 13a, a CAD program storage 13b, and a modem 15. Attached peripherals include a keyboard 11, a video monitor 14, a three-dimensional scanner 12, and a video camera 16. The video camera 16 captures the optical image of the object or surface scanned by scanner 12. Other photosensitive or photographic recording devices 16 can be used to capture the optical image of the object or surface including, for example, still photography cameras and the like. In this embodiment, the personal computer 13 functions to superimpose the scanned image of the object or surface with the optical image.

There are many applications for the present invention. One application is video conferencing. With the present invention, a three-dimensional image of an object or surface can be displayed to and manipulated by all the participants of a video conference. For example, a circuit board or connector can be scanned and displayed in three-dimensions for the purpose of design discussion, adding depth to what would otherwise have been a two-dimensional image of the object being discussed.

The present invention also has applications in consumer goods. The interactive video will open a broad market in video based shopping. One specific area is in apparel purchasing. A consumer can now transmit his or her dimensions and topology to the vendor using the scanning device 10 of the present invention. The vendor's software can then select the exact size suitable for the customer and retransmit a three-dimensional image of the article of clothing as it would look on the customer to assist the customer in making the decision whether to buy.

The present invention can also be applied in architectural modeling for such things as interior decoration and spatial dimensioning.

Finally, the present invention has applications in the medical field. With the interactive three-dimensional scanning device or system 10 of the present invention, the dimensions and topological information associated with an accident victim can be scanned by a paramedic or emergency medical technician and displayed at a remote hospital to facilitate instructions or supervision by doctors at the hospital regarding surgical procedures to use or other treatments for the victim.

Other embodiments and applications for the present invention will be readily apparent to those of ordinary skill in the art, and all such embodiments and applications for the present invention are considered to fall within the scope of the invention as defined by the appended claims.

What is claimed is:

1. An interactive scanning device, comprising:
   means for scanning an object or surface to obtain information about the object or surface;
   means for interactively displaying and changing the physical characteristics of a three-dimensional image of the object or surface from the information; and
   means for interfacing with and transmitting the changed image and/or information about the changed image over a communication medium.

2. The device of claim 1, wherein the information is the geometrical dimensions of the object.

3. The device of claim 1, wherein the information is the topology of the surface.

4. The device of claim 1, wherein the means for scanning comprises first means for scanning an object and second means for scanning the surfaces of the object.

5. The device of claim 4, wherein the information comprises the geometrical dimensions of the object and the topology of the surface or surfaces of the object.

6. The device of claim 1, wherein the means for scanning is a three-dimensional scanner.

7. The device of claim 1, wherein the means for scanning is a two-dimensional scanner.

8. The device of claim 1, wherein the means for scanning is a one-dimensional scanner.

9. The device of claim 1, wherein the means for scanning comprises a plurality of scanners.

10. The device of claim 1, wherein the means for scanning is an infrared scanner.

11. The device of claim 1, wherein the means for scanning is a laser scanner.

12. The device of claim 1, wherein the means for scanning is a radar scanner.

13. The device of claim 1, wherein the means for scanning is a radio wave scanner.

14. The device of claim 1, wherein the means for scanning is an ultra-sound scanner.

15. The device of claim 1, wherein the means for scanning is a low level radiation scanner.

16. The device of claim 1, wherein the means for scanning is an electron scanning microscope.

17. The device of claim 1, wherein the means for interactively displaying and manipulating a three-dimensional image of the object or surface from the information comprises an image processor.

18. The device of claim 17, wherein the image processor includes an input device and an image display.

19. The device of claim 18, wherein the input device is a touch screen.

20. The device of claim 18, wherein the input device is a keyboard.

21. The device of claim 18, wherein the input device is a mouse.

22. The device of claim 18, wherein the image display is a color monitor.

23. The device of claim 1, wherein the means for interactively displaying and manipulating a three-dimensional image of the object or surface comprises a personal computer using a CAD program.

24. The device of claim 1, wherein the means for interactively displaying and manipulating a three-dimensional image of the object or surface comprises a computer workstation using a solid modeling software program.

25. The device of claim 1, wherein the means for interactively displaying and manipulating a three-dimensional image of the object or surface comprises a microprocessor using a solid modeling software program.

26. The device of claim 1, wherein the means for interactively displaying and manipulating a three-dimensional image of the object or surface comprises a minicomputer using a solid modeling software program.

27. The device of claim 1, wherein the means for interactively displaying and manipulating a three-dimensional image of the object or surface comprises a mainframe computer using a solid modeling software program.

28. The device of claim 1, wherein the communication medium is a wire medium.

29. The device of claim 28, wherein the wire medium is a telephone line.

30. The device of claim 28, wherein the wire medium is a coaxial cable.

31. The device of claim 28, wherein the wire medium is a fiber optic cable.

32. The device of claim 28, wherein the wire medium is an IEEE-488 bus.

33. The device of claim 1, wherein the communication medium is a wireless medium.

34. The device of claim 1, wherein the wireless medium is a light wave.

35. The device of claim 1, wherein the wireless medium is a radio wave.

36. The device of claim 1, wherein the means for interfacing and transmitting comprises a modem.

37. The device of claim 1, wherein the means for interfacing and transmitting comprises a radio wave transmitter.

38. The device of claim 1, wherein the means for interfacing and transmitting comprises a light wave transmitter.

39. The device of claim 1, wherein the means for interfacing and transmitting comprises a network interface card.

40. The device of claim 1, wherein the means for interfacing and transmitting includes means for compressing the information before transmission.

41. The device of claim 1, further comprising means for capturing an optical image of the object or surface and superimposing the optical image with the three-dimensional image of the object or surface.

42. The device of claim 41, wherein the further means comprises a video camera.

43. The device of claim 41, wherein the further means comprises a still photography camera.

44. A communication system for interactively displaying and altering a three-dimensional image of an object or surface, comprising:

a first end user station including at least one interactive scanning device operably coupled to a communication medium, said scanning device capable of capturing information about the object or surface, interactively displaying and manipulating a three-dimensional image of the object or surface from the information, and interfacing with and transmitting the information or image over the communication medium; and a second end user station operably coupled to the communication medium including at least one computer station capable of receiving the information or image over the communication medium from the interactive scanning device and interactively displaying and altering the image and transmitting the altered image to the first end user station.

45. The communication system of claim 44, wherein the first end user station further includes at least one computer station.

46. The communication system of claim 44, wherein the second end user station further includes at least one interactive scanning device.

47. An interactive scanning device, comprising:

at least one scanner for scanning an object or surface to obtain information about the object or surface;

an image processor having an input device and an image display for interactively displaying and changing the physical characteristics of a three-dimensional image of the object or surface from the information; and a communication interface for interfacing with and transmitting the changed image and/or information about the changed image over a communication medium.

48. An interactive scanning system, comprising:

a plurality of scanners for scanning an object or surface to obtain information about the object or surface;

an image processor having an input device and an image display for interactively displaying and changing the physical characteristics of a three-dimensional image of the object or surface from the information; and a communication interface for interfacing with and transmitting the changed image and/or information about the changed image over a communication medium.

49. A communication system for interactively displaying and altering a three-dimensional image of an object or surface, comprising:

a first end user station operably coupled to a communication medium including at least one interactive scanning system, said scanning system capable of capturing information about the object or surface, interactively displaying and manipulating a three-dimensional image of the object or surface from the information, and interfacing with and transmitting the information or image over the medium; and a second end user station operably coupled to the communication medium including at least one computer station for receiving the information or image over the communication medium from the scanning system and capable of interactively displaying and altering the image and transmitting the altered image to the first end user station.

50. The system of claim 49, wherein the medium is a telecommunication medium.

51. A method of interactively displaying and changing a three-dimensional image of an object or surface, comprising:

scanning an object to obtain information about the object or surface;

interactively displaying and changing the physical characteristics of a three-dimensional image of the object or surface from the information; and interfacing with and transmitting the changed image and/or information about the changed image over a communication medium.

52. The method of claim 51, wherein the information or image is first transmitted over the communication medium and then the three-dimensional image of the object or surface is interactively displayed and manipulated.

53. An interactive scanning system, comprising:

at least one three-dimensional scanner for scanning an object or surface to obtain information about the object or surface;

at least one video camera for capturing an optical image of the object or surface; and a computer processor, having a CAD program, an input device and an image display, for interactively displaying and changing the physical characteristics of a three-dimensional image of the object or surface from the information and for super-imposing the optical image with the three-dimensional image; and a communication interface for interfacing with and transmitting the changed image and/or information about the changed image over a communication medium.

* * * * *